(12) United States Patent
Sylvain

(10) Patent No.: US 8,223,929 B2
(45) Date of Patent: Jul. 17, 2012

(54) INTERACTIVE WEB INTERFACE FOR INTERACTIVE VOICE RESPONSE

(75) Inventor: Dany Sylvain, Gatineau (CA)

(73) Assignee: Avaya Inc., Basking Ridge, NJ (US)

( * ) Notice: Subject to any disclaimer, the term of this patent is extended or adjusted under 35 U.S.C. 154(b) by 1244 days.

(21) Appl. No.: 11/960,296

(22) Filed: Dec. 19, 2007

(65) Prior Publication Data

US 2009/0161842 A1    Jun. 25, 2009

(51) Int. Cl.
*H04M 1/64* (2006.01)
(52) U.S. Cl. ............... 379/88.01; 379/88.17; 379/90.01; 707/10; 370/352
(58) Field of Classification Search ............... 379/93.05, 379/88.01; 707/10
See application file for complete search history.

(56) References Cited

U.S. PATENT DOCUMENTS

| 5,907,547 | A | * | 5/1999 | Foladare et al. ............. 370/352 |
| 6,130,933 | A | * | 10/2000 | Miloslavsky ............... 379/90.01 |
| 6,456,699 | B1 | * | 9/2002 | Burg et al. ................ 379/88.17 |
| 6,990,495 | B1 | * | 1/2006 | Grason et al. ........................ 1/1 |

* cited by examiner

*Primary Examiner* — Fan Tsang
*Assistant Examiner* — Van D Huynh
(74) *Attorney, Agent, or Firm* — Chapin IP Law, LLC

(57) ABSTRACT

Described are a system and method for establishing a communication session between an end user and a communication destination of an interactive voice response (IVR) system. A click-to-call server transmits a web page over a network for display in a browser window at a client system. The web page presents a web menu corresponding to an IVR audio menu of the IVR system and has a link by which the end user of the client system can submit a click-to-call request. The click-to-call server receives a click-to-call request from the client system over the network in response to activation of the link in the web page. The click-to-call server sets up a communication session between a communication device identified by the end user and a communication destination of the IVR system in response to receiving the click-to-call request.

20 Claims, 7 Drawing Sheets

INTERACTIVE WEB INTERFACE FOR INTERACTIVE VOICE RESPONSE

FIELD OF THE INVENTION

The present invention relates generally to interactive voice response (IVR) systems. More particularly, the present invention relates to an interactive web interface for use with IVR.

BACKGROUND

Interactive voice response, or IVR, is a telephone technology that enables a computer to detect dual-tone multi-frequency (DTMF) signaling or perform voice recognition during a conventional telephone call. Current IVR systems typically respond to a caller with prerecorded or dynamically generated audio that guides the caller through extensive menus to the sought-after individual or department within an enterprise. This automation saves money for the enterprise by eliminating the need for human agents to handle incoming telephone calls. This benefit comes, however, at the expense of caller satisfaction. Callers frequently become frustrated with the IVR because they find the various IVR menus time consuming and baffling, often leading to dead ends. Such experiences have led to a generally critical opinion of IVR systems, that they are impersonal, inefficient, and incapable of adequately addressing a caller's needs.

Caller dissatisfaction lies also with IVR systems employing generic voice recognition—where a user can speak the name of the desired service into the telephone and be connected to that service—because such systems can be unreliable. A key difficulty lies in anticipating the various potential structures of a customer's verbal request. For example, a caller may say, "I have a problem with my bill", or simply "bill", "billing", "facturation", "wrong billing", or "double billing". Different accents and pronunciations present additional challenges for successful voice recognition. If the IVR system cannot recognize the caller's request, the IVR system may repeatedly ask the caller to repeat it, which can only add to the caller's frustration.

SUMMARY

In one aspect, the invention features a method for establishing a communication session between an end user and a communication destination of an interactive voice response (IVR) system. The method includes transmitting, over a network for display in a browser window at a client system, a web page presenting a web menu corresponding to an IVR audio menu of the IVR system. The web page has a link by which the end user of the client system can submit a click-to-call request. The click-to-call request is received from the client system over the network in response to activation of the link in the web page. A communication session is set up between a communication device of the end user and a communication destination of the IVR system in response to receiving the click-to-call request.

In another aspect, the invention features a communications system comprising an interactive voice response (IVR) server for audibly presenting to an end user one or more menus that guide the end user to a communication destination. The communications system also includes a click-to-call server transmitting, over a network for display in a browser window at a client system, a web page presenting a web menu corresponding to an IVR audio menu of the IVR system. The web page has a link by which an end user of the client system can submit a click-to-call request to the click-to-call server. The click-to-call server sets up a communication session between a communication device of the end user and a communication destination of the IVR server upon receiving the click-to-call request.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

DETAILED DESCRIPTION

Communication systems embodying the present invention simplify customer service by presenting an augmented click-to-call (c2c) web interface through which an end user can communicate with an IVR system. This c2c web interface presents to the end user an interactive menu that is closely coupled to an IVR audio menu of the IVR system. With the interactive menu of the c2c web interface serving as a visual guide, the end user can virtually navigate the IVR menu, making faster and more reliable identifications and selections of desired IVR menu items. In some embodiments, the end user can select a menu item through the c2c web interface before calling the IVR system. A c2c server in communication with the IVR system can update the c2c web interface appropriately to correspond with a current virtual or actual location of the end user within in the IVR menu based on the user's menu item selection.

Figure 1:
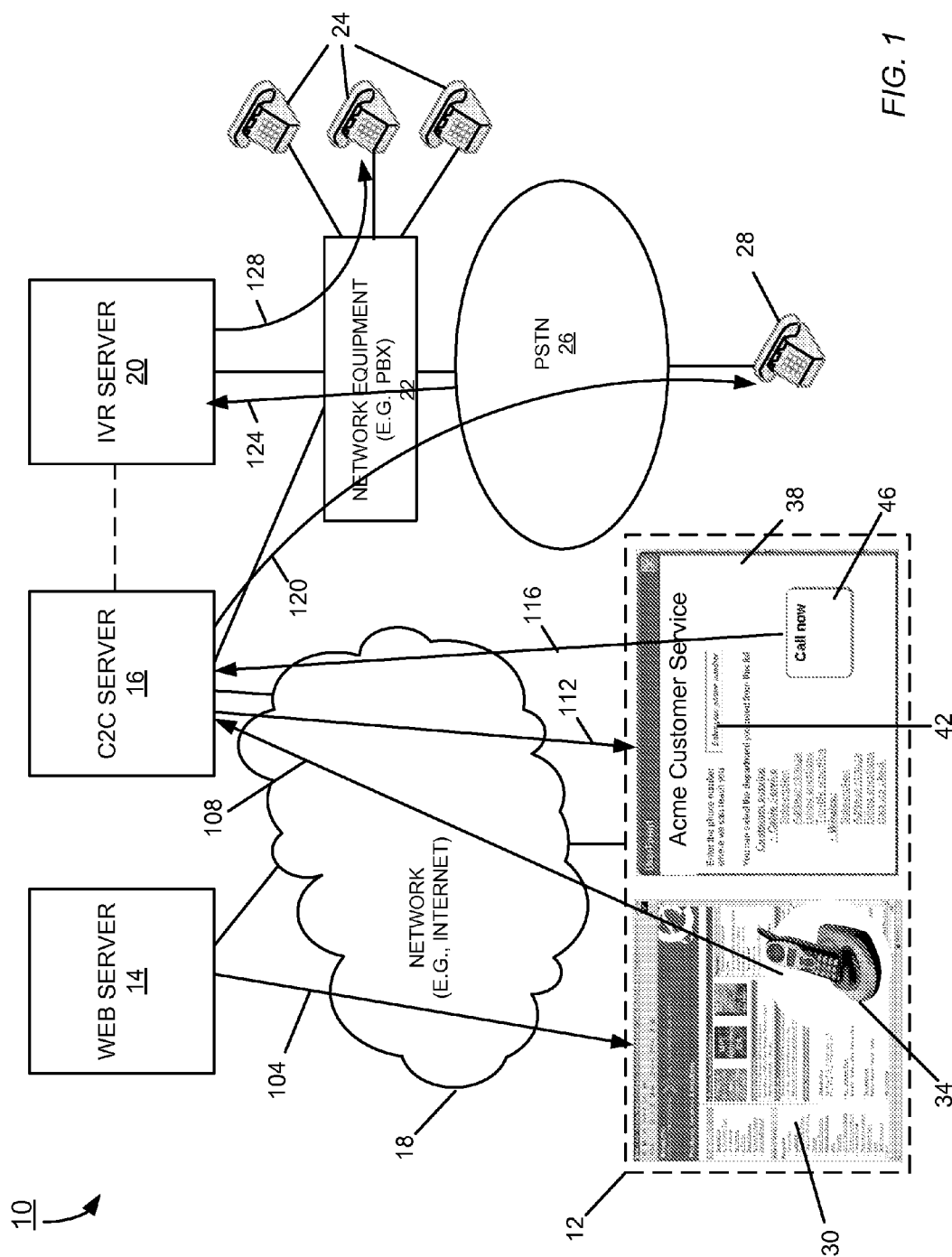
FIG. 1 is a diagram of an embodiment of a communications network in which the principles of the invention may be practiced.

FIG. 1 shows an example of a communications system 10 in which the principles of the invention may be practiced. The communications system 10 includes a client system 12 in communication with a Web server 14 and a c2c server 16 over a network 18 (e.g., the Internet). In one embodiment, illustrated by a dotted line, the c2c server 16 is also in communication with an IVR server 20. The IVR server 20 includes hardware and software for running an IVR application for an enterprise. The c2c server 16 and IVR server 20 can be implemented within a single computing system or in separate computing systems.

The c2c server 16 and the IVR server 20 are connected to network equipment 22 (e.g., a PBX or private branch exchange), which serves as a connection between IVR destinations 24 (e.g., telephones) of the enterprise and the public switched telephone network (PSTN) 26. In this exemplary illustration, the user of the client system 12 has access to a telephone 28 (connected to the PSTN 26).

The client system 12 is a representative example of one of the many independently operated computing systems that may establish a connection with the c2c server 16 in order to access the interactive c2c web interface of the invention. Exemplary implementations of the client system 12 include, but are not limited to, personal computers (PC), Macintosh computers, workstations, laptop computers, terminals, kiosks, hand-held devices, such as a personal digital assistant (PDA), mobile or cellular phones, navigation and global positioning systems, and any other Web-browser-enabled computing device with a display screen, a processor for running application programs, memory, and one or more input devices (e.g., keyboard, touch-screen, mouse, etc.). The client system 12 can run any commercially available Web browser (e.g., Microsoft INTERNET EXPLORER®, Mozilla FIREFOX®, NETSCAPE®, and SAFARI®) for executing HTML (Hypertext Markup Language) and XML (Extensible Markup Language) code and communicating with the Web server 14 and c2c server 16 in accordance with the HTTP (HyperText Transport Protocol).

The Web server 14 is, in general, a computing system or a program executing on a computing system that sends web pages (e.g., HTML and XML web documents) to client systems, such as client system 12, in response to HTTP requests.

The c2c server 16 provides a service by which a user who is browsing a website can initiate a voice, video, or multimedia communication session with another party, typically someone associated with the website, by clicking an icon, button, or link embedded in a c2c web page. The establishment of the communication session can occur in various ways. For example, in response to clicking the button, the user receives a form requesting a phone number. Upon receipt of the phone number, the c2c server 16 attempts to establish a telephone call between the user at this phone number and the targeted other party.

As another example, the voice, video, or multimedia communications can be established with the client system 12 (e.g., through a VOIP service, such as SKYPE™). In this example, the client system 12 runs SIP client software and sends a communication address to the c2c server 16 for use in establishing the communications. When the user is browsing web sites on Internet, for example, using a mobile phone with voice capability (e.g., an iPhone™), the voice communications can be established directly with the mobile phone. Hereafter, a communication device refers generally to any type of device (e.g., landline telephone, computer, mobile phone) used by the end user to communicate with the other party.

Figure 2:
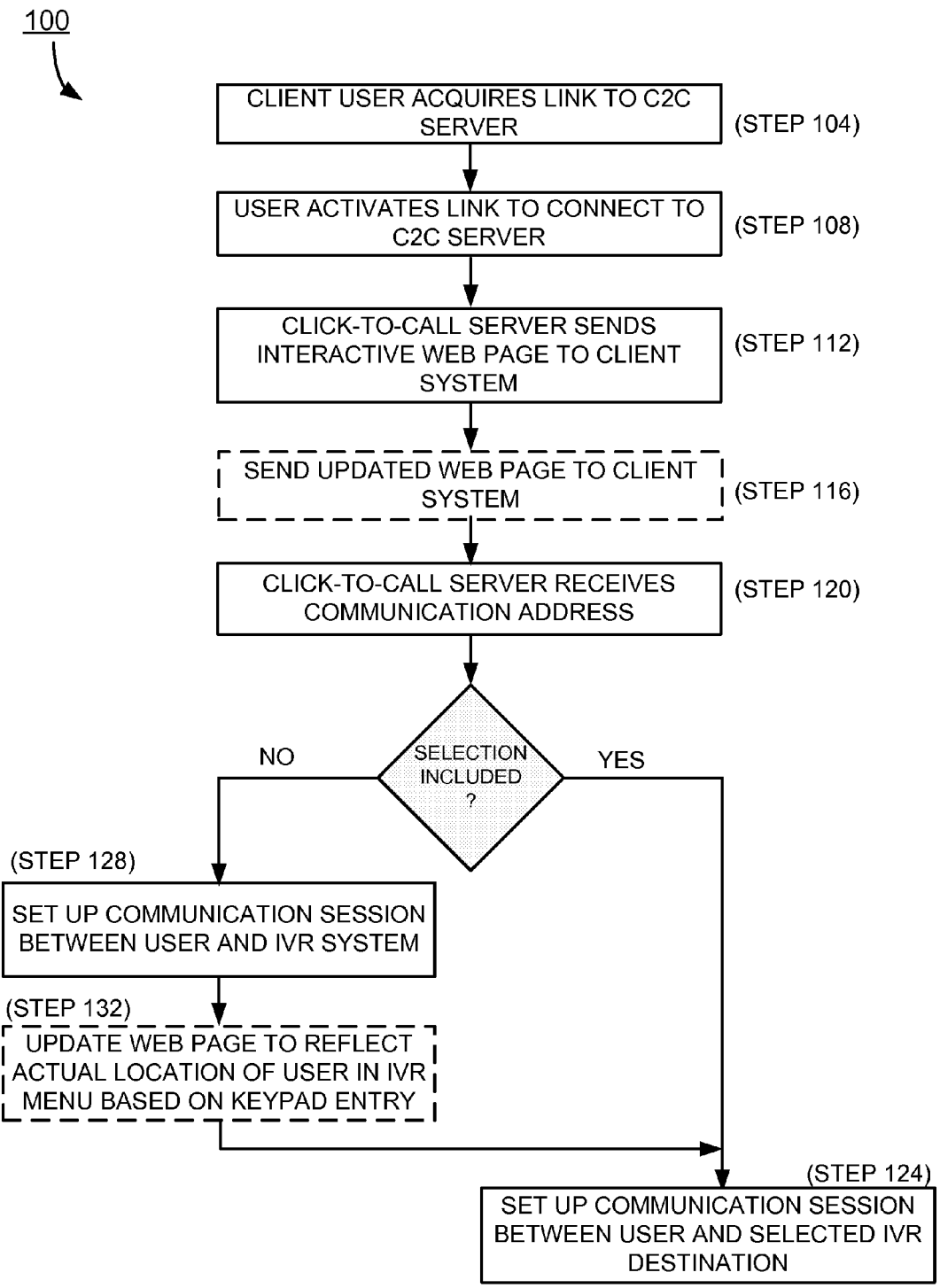
FIG. 2 is a flow diagram of an embodiment of process for establishing a communication session between an end user and a communication destination of an IVR system using an interactive web interface in accordance with the invention.

FIG. 2 provides a general overview of a process 100 for establishing a communication session between an end user and a communication destination of an IVR system using an interactive web interface in accordance with the invention. In the description of the process 100, reference is also made to FIG. 1, in which appear arrows with reference numerals corresponding to the steps of the process 100 described below. Steps identified by dashed boxes are operations that may be performed during different embodiments of the process 100.

At step 104, a user of the client system 12 acquires a link for initiating a call to another party, such as an enterprise or company. For example, the user accesses the company web site by downloading a web page 30 from the web server 14 over the network 18. This web page 30 includes a link 34 to the URL (universal resource locator) of the c2c server 16. In this example, the link 34 manifests by rolling the cursor over an image of a telephone in the web page 30.

Receipt of the link 34 by way of the web page 30 is one of a variety of means by which the end user can acquire the link 34. As other examples, the link 34 can be embedded in an email message, in a chat message, in a text message, in a video game, and in a variety of application programs, or the end user can acquire the link 34 by word of mouth. In any of these contexts, a mouse click can activate the link 34 or, alternatively, the link 34 can be cut and pasted or typed into the URL field of a browser window.

Activating the link 34 causes a new browser window to open and initiates (step 108) communication with the c2c server 16. In response, the c2c server 16 sends (step 112) an interactive web page 38 (i.e., web document) to the client system 12. The web page 38 can be written in any of a variety of languages used for constructing web pages (e.g., HTML, XML). The interactive web page 38 includes a field 42 within which the user enters a communication address, at which the end user may be reached, such as a telephone number or a SIP (session initiation protocol) address. The provided communication address enables a voice, video, or multimedia communication session to be established with the end user at the communication device associated with that communication address.

In one embodiment, the interactive web page 38 presents a menu that mimics the menu structure of the IVR system. In another embodiment, the web page 38 provides a directory service corresponding to an enterprise directory service provided by the IVR system. These embodiments are described in more detail below.

The interactive web page 38 also includes a "call now" button 46. The end user clicks on this button 46 to initiate a call to the enterprise, i.e., through the enterprise IVR system. Before activating the button 46, the user may select a menu item (when the IVR system presents an IVR audio menu) or a name (when the IVR provides a directory service). Alternatively, the end user may activate the "call now" button without having made any selection.

Through the interactive web page 38, the client user can also submit supplemental information to the c2 server 16, for example, an account number, credit card number, name of user, billing address, etc., if the IVR system can use such information for processing the call and the web page 38 provides a field for receiving such information.

Before the user clicks on the "call now" button 46, the c2c server 16 may dynamically update (step 116) the web page 38, so that the displayed web interface corresponds to the current virtual location of the user in the IVR system based on a user selection or information entry made by the user. The current location is considered virtual because the user is not yet communicating with the IVR system, but the web interface displays the location as though the user has navigated through the IVR. After the user clicks on the "call now"

button 46, the c2c server 16 receives (step 120) the communication address, including any selection or supplemental information.

If the end user includes a selection at the time of initiating the call, the c2c server 16 communicates (step 124) with the network equipment 22 to establish the communication session between the user telephone 28 and the selected communication destination within the IVR system (as identified by the selection, for example, of the customer service department, or of an identified individual).

The c2c server 16 can employ one of a variety of techniques to set up this communication session with this selected communication destination, including, but not limited to: (1) calling a specific phone number associated with the selection; (2) calling the IVR system and automatically inserting—through communication equipment—the DTMF tones corresponding to the telephone keypad in the call path on behalf of the user; and (3) calling the IVR system and communicating the user selection through a separate channel to IVR; and (4) sending a request the IVR system (e.g. using a web service interface) to place an outbound call to the user and passing the user selection to the IVR system through this external request.

Alternatively, if the end user initiates the call without having made a selection, the c2c-server 16 communicates (step 128) with the network equipment 22 to set-up a communication session between the end user and the IVR system through one or a combination of the PSTN 26, Internet 18, and PBX 22, using the communication address provided by the user, which, in this example, is a telephone number associated with the user telephone 28.

Upon being connected to the IVR system, the end user can immediately submit—using, for example, the keypad of the telephone 28—a menu item selection or telephone extension number. Because the interactive web page 38 displays the menu structure (or, names and extension in the case of a directory service) of the IVR, the user is able to navigate quickly through the IVR to the desired destination. In one embodiment, the c2c server 16 dynamically updates (step 132) the interactive web page 38 so that the displayed web menu corresponds to the actual current location of the user in the IVR audio menu based on the menu selections submitted by the user through the telephone keypad. After the user navigates the IVR system using keyed input to the desired IVR destination, the communication session is set up (step 124) between the end user and this communication destination.

Figure 3:
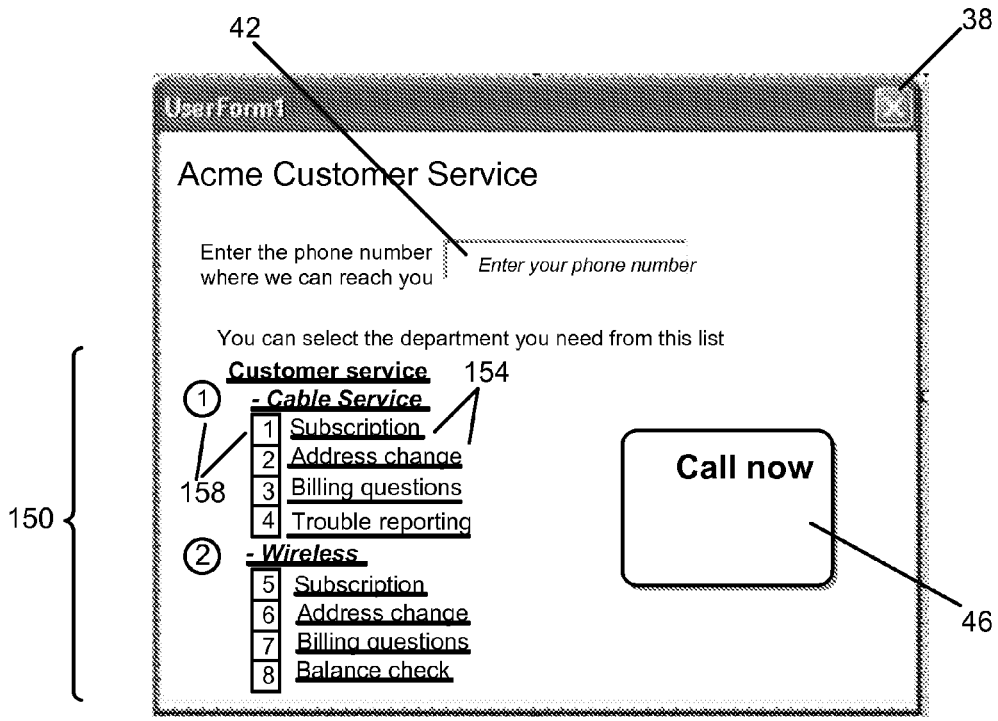
FIG. 3 is a diagram of an exemplary click-to-call web page—downloaded by the client user from a click-to-call server—that presents an interactive web interface for navigating an IVR system.

FIG. 3 shows one embodiment of the interactive web page 38 sent by the c2c server 16 to the client system 12. In this example, the web page 38 provides an interactive web interface to customer service at the Acme Corporation. The web page 38 has the communication address field 42, the call-now button 46, and an expandable and collapsible hierarchical tree 150 of selectable menu items 154. At the root of the tree 150 (i.e., the highest hierarchical level) is the Customer Service department. At the next level are various types of departments (i.e., Cable service, Wireless service). Beneath this level are the individually selectable items 154 representing a particular action that the user may want to take (e.g., obtain a subscription, make an address change, ask billing questions, etc). The tree 150 corresponds to the menu structure of Acme's IVR system.

In this embodiment, a digit 158 appears adjacent to each department level and each selectable menu item 154 in the tree 150. These digits 158 correspond to phone digits used by the IVR system to call the various departments and services within the enterprise. For example, to guide a user in making an address change for a Cable Service, the IVR system can say, "For the Cable Service department, please press 1. For the Wireless Service department, please press 2". If the user presses 1, the IVR system can continue: "To obtain a subscription, press 1; to make an address change, press 2; for billing questions, press 3, for trouble reporting, press 4". Each digit 158 appearing adjacent a department or service in the web menu matches the corresponding phone digit mentioned by the IVR system.

These digits 158 thus assist the user in visually following along and manually keying in the digits (e.g., on the telephone's keypad) while listening to the options presented by the IVR system. Some IVR systems allow digits to be submitted ahead, before the IVR system reaches a particular option. In such instances, the digits 158 provide the appropriate digit sequence that the user can submit through the telephone 28 so as not to have to listen to the full IVR message.

Figure 4:
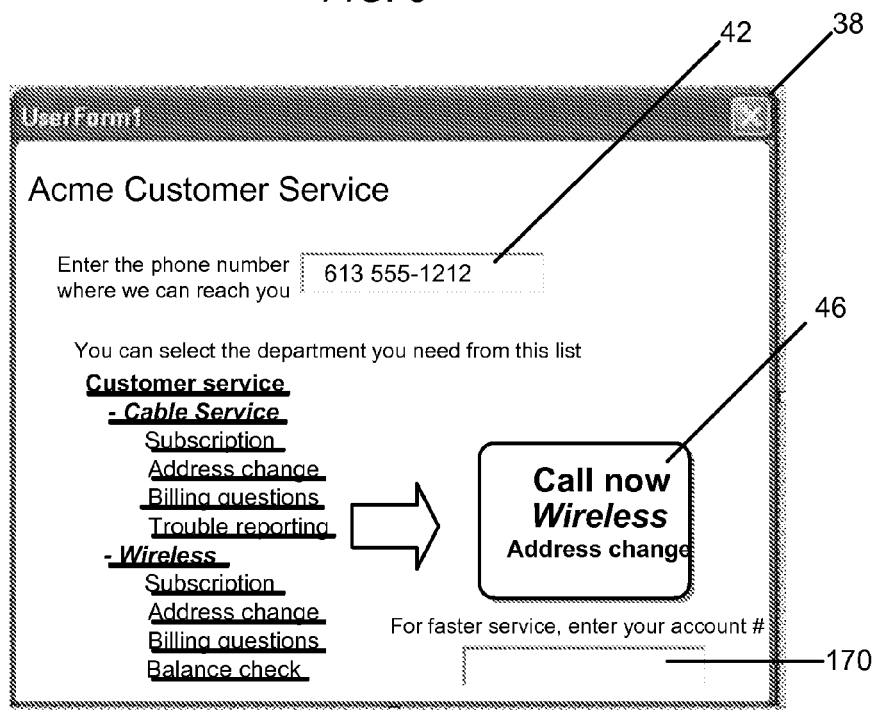
FIG. 4 is a diagram of an exemplary downloaded click-to-call web page into which the caller has entered a communication address and selected a menu item before initiating a call to an IVR system.

FIG. 4 shows another embodiment of the web page 38 sent by the c2c server 16 to the client system 12. In this example, the end user has entered the telephone number at which to be reached, and selected the Wireless—address change menu item before initiating the call. The selected menu item appears in the "call now" button 46. The web page 38 also has a supplemental information field 170, in which the client user can enter additional information, such as an account number, credit card number, phone number, name, etc., to facilitate prompt service. Often, the IVR system collects this type of information through telephone keypad entry, which can be cumbersome.

Figure 5:
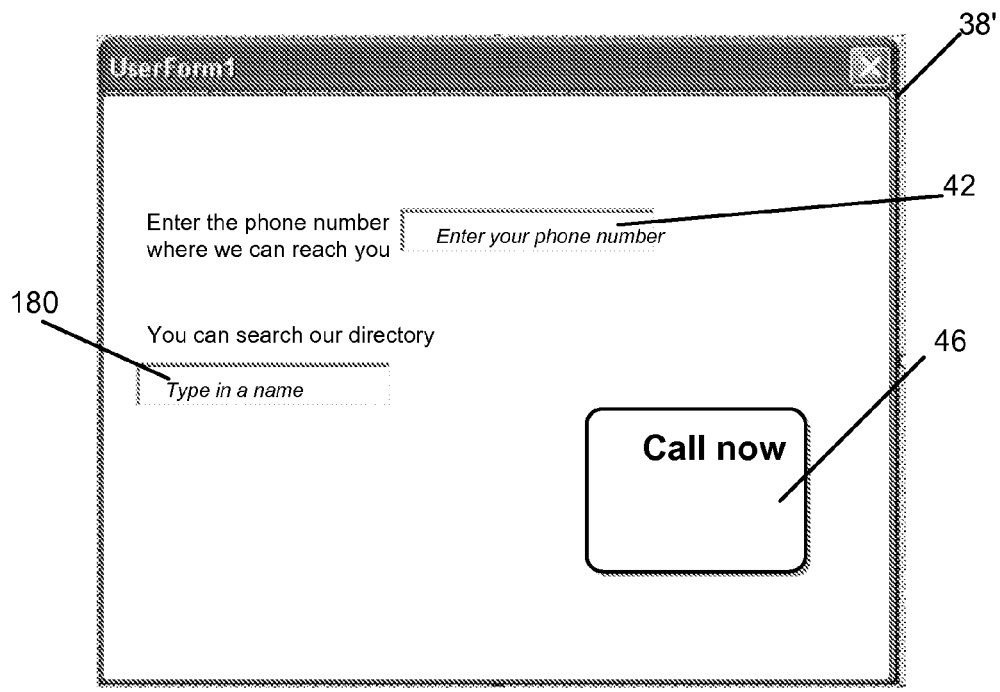
FIG. 5 is a diagram of another exemplary click-to-call web page for presenting an interactive web interface to an IVR system that supports a directory service.

FIG. 5 shows an embodiment of a c2c web page 38' for presenting an interactive web interface to a particular type of IVR system that supports an enterprise directory service. Many enterprises use extension numbers to reach individuals or departments from one main public number. The c2c web page 38' can allow the user to view or search the enterprise directory, select a name or phone number, and initiate the communication session directed to the intended party within the enterprise.

In the shown embodiment, the c2c web page 38' includes the communication address field 42, the call-now button 46, and a search field 180 in which the user can submit the name or a portion of the name of the person with whom the user desires to speak.

Figure 6:
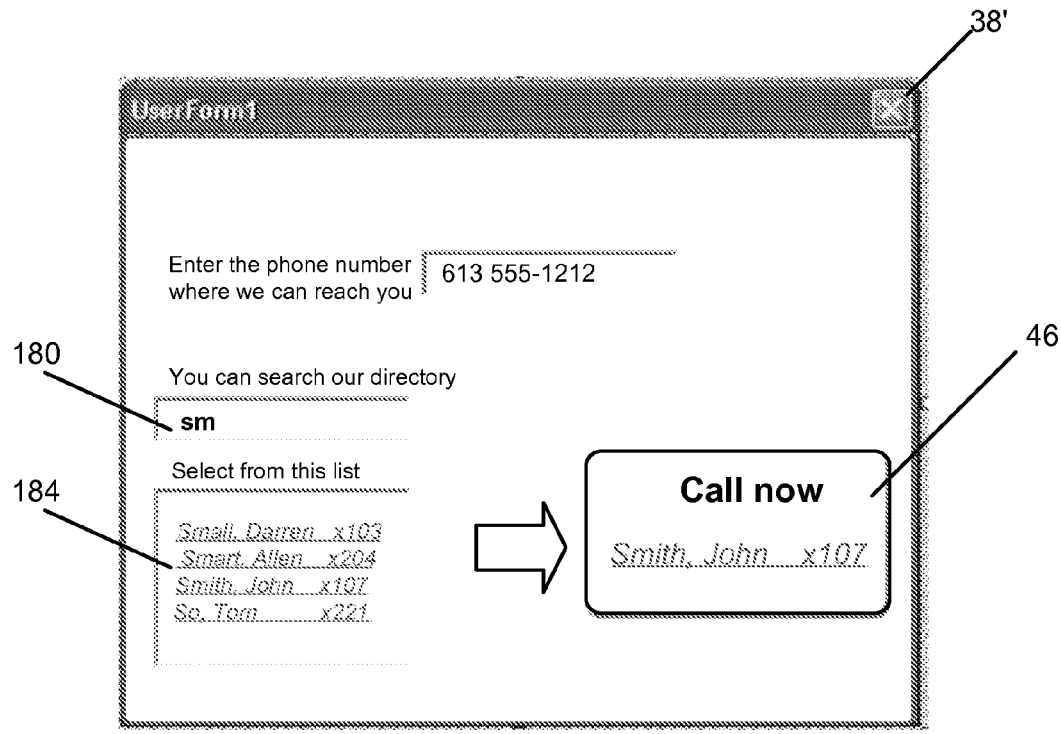
FIG. 6 is a diagram of the exemplary click-to-call web page of FIG. 5 into which the end user has entered a communication address and selected a name from the directory before initiating a call to the IVR system.

FIG. 6 shows the c2c web page 38' after the end user has started entering characters—here, for example, "sm"—into the search field 180. In response to these characters, the c2c server 16 dynamically identifies matching names from the enterprise directory and displays the list in a search result window 184. Any name selected from the directory appears in the "call now' button 46.

Figure 7:
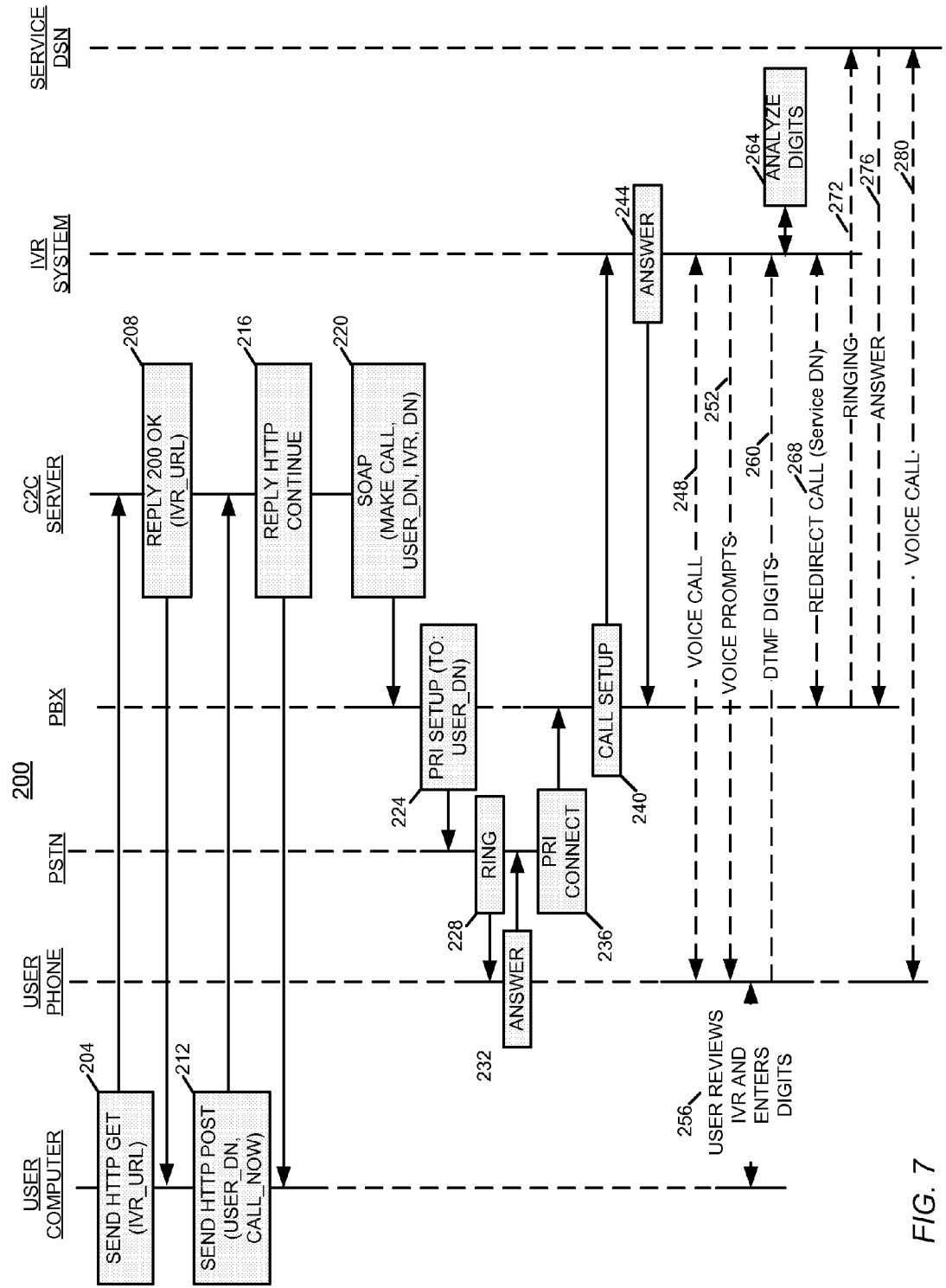
FIG. 7 is a flow diagram of an embodiment of a process for establishing a communication session between an end user and an IVR destination when the end user uses the interactive web interface as a navigational guide for submitting responses manually to the IVR system.

FIG. 7 shows an embodiment of a process 200 for establishing a communication session between an end user and an IVR destination when the end user uses the interactive web interface as a navigational guide for submitting responses manually to the IVR system. In this process 200, the end user manually submits digits through the telephone keypad while listening to the IVR audio menu, visually guided by the interactive web menu.

At step 204, the client system 12 sends an HTTP Get command to the c2c server 16. The command includes the URL of the IVR as a parameter. The c2c server 16 replies (step 208) to the client system 12 with the HTTP response (200 OK) providing the content for web page 38. When the user clicks on the "call now" button 46, the client system 12 sends (step 212) an HTTP post command, passing the user's communication address and a "call now" request to the c2c server 16. The c2c server 16 replies (step 216) with an HTTP continue message.

In addition, the c2c server 16 sends (step 220) a SOAP (Simple Object Access Protocol) request to the PBX 22. The request includes a "Make Call" command and the communication addresses of the parties to the call (i.e., the user and the IVR). In response, the PBX 22 issues (step 224) a PRI Setup request to the PSTN 26. The PSTN 26 rings (step 228) the user phone and when the user answers (step 232), the PSTN sends (step 236) a PRI connect request back to the PBX 22. The PBX then issues (step 240) a call setup request to the IVR system.

When the IVR system answers (step 244) in response to the call set up request, a voice call is established (step 248) between the user phone and the IVR system, during which the IVR system sends (step 252) voice prompts to the user phone. At step 256, the user listens to the IVR prompts, reviews the interactive web interface, and enters phone digits through the telephone keypad. From the user phone, DTMF tones corresponding to the entered phone digits pass (step 260) to the IVR system. The IVR system analyzes (step 264) the digits and communicates (step 268) with the PBX 22 to redirect the call to the communication destination (e.g., service) selected by the end user. The PBX 22 rings (step 272) the communication destination within the enterprise and the communication destination answers (step 276), thus establishing (step 280) a voice call between the user and the sought-for communication destination.

Figure 8A:
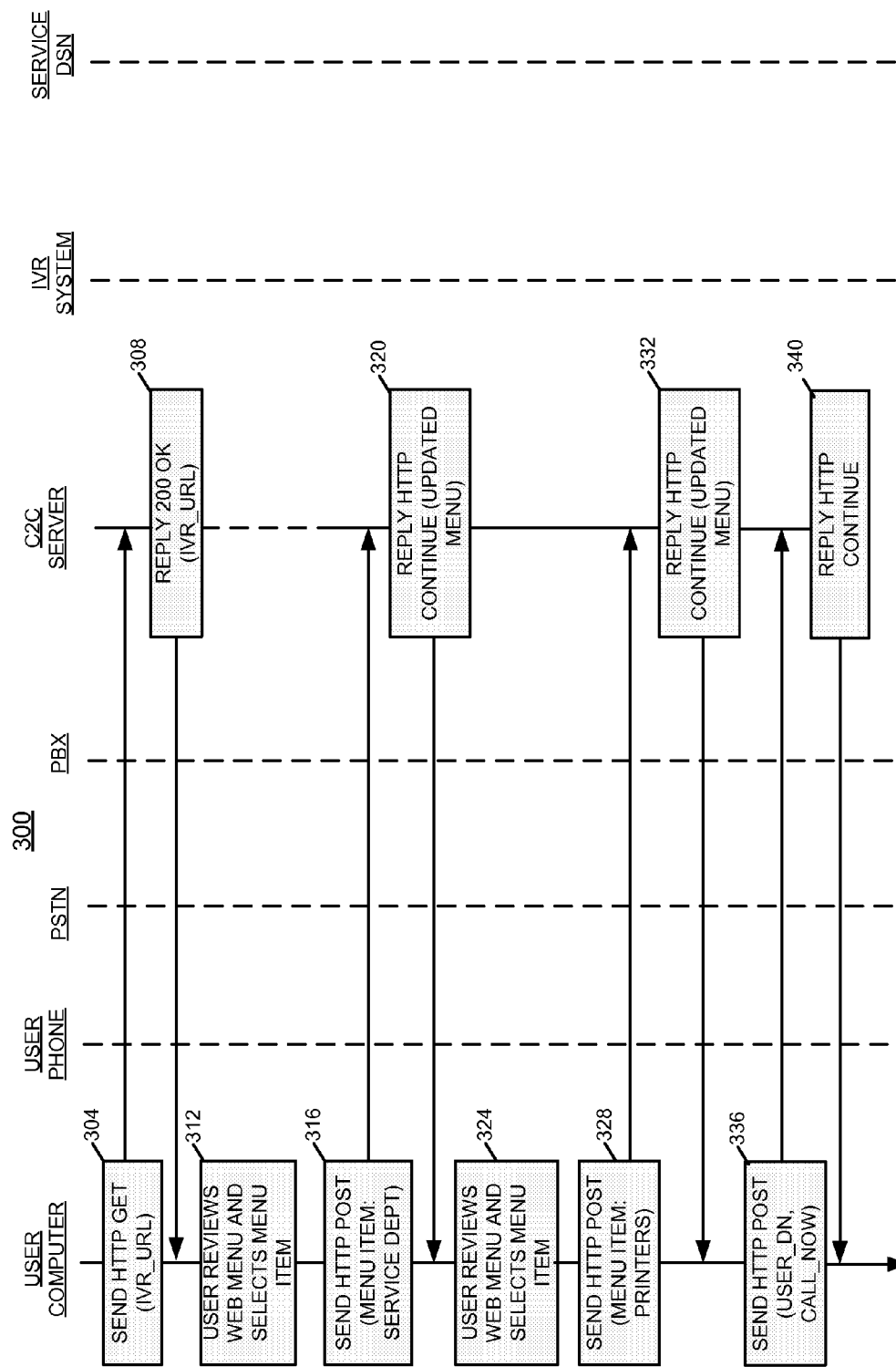
FIG. 8A and FIG. 8B comprise a flow diagram of an embodiment of a process for establishing a communication session between an end user and an IVR destination when the end user submits a menu item selection through an interactive web interface.
Figure 8B:
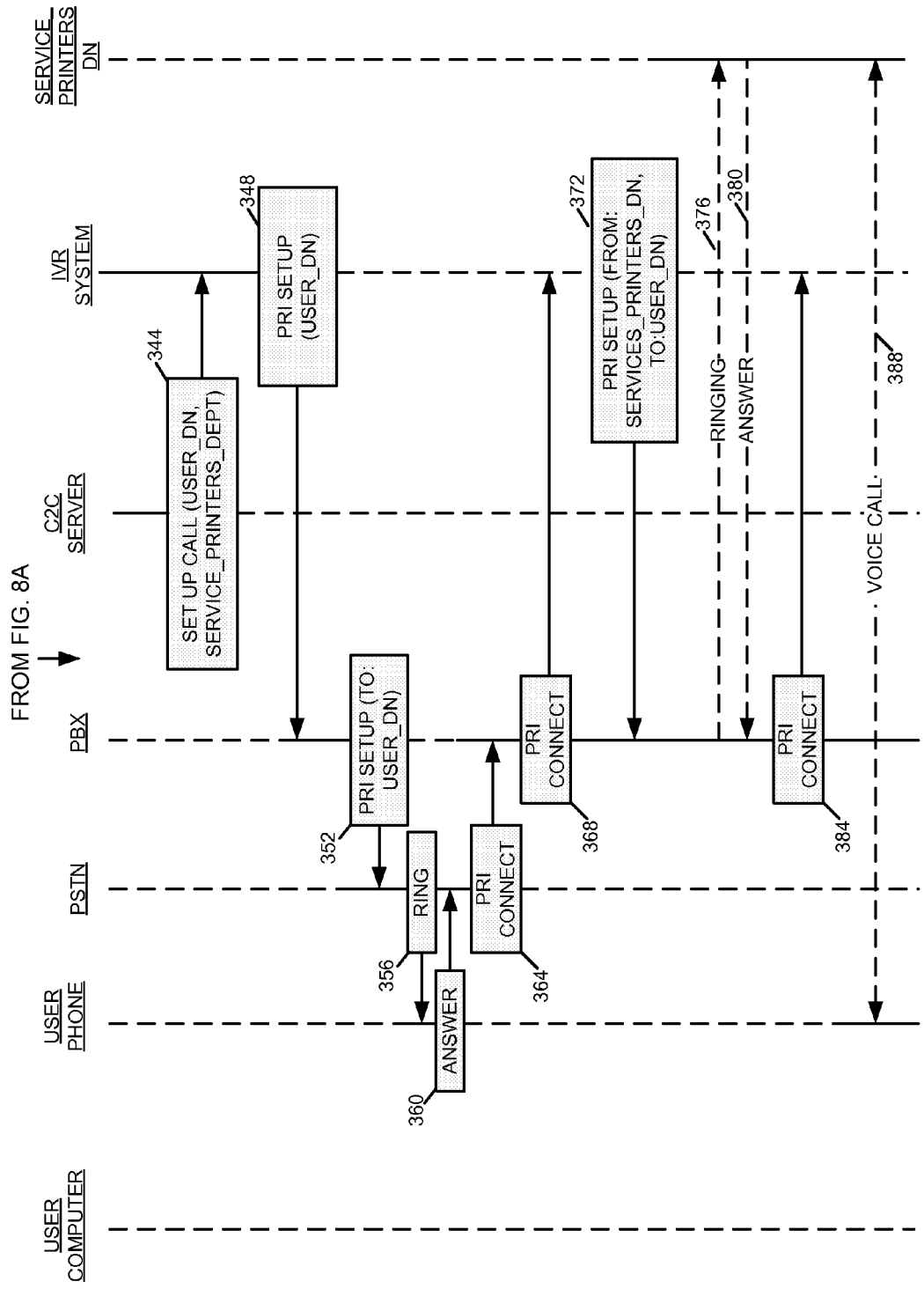

FIG. 8A and FIG. 8B show an embodiment of a process 300 for establishing a communication session between an end user and an IVR destination when the end user selects a menu item through the interactive web interface before initiating the call. Referring now to FIG. 8A, at step 304, the client system 12 sends a HTTP Get command to the c2c server 16, including the URL of the IVR. At step 308, the c2c server 16 replies to the client system 12 with the HTTP response (200 OK) providing the content for web page 38.

The user of the client system 12 reviews (step 312) the web menu and selects a menu item (here, for example, the selected menu item is the "Service Department"). The client system 12 sends (step 316) to the c2c server 16 an HTTP post command that includes the selected menu item as a parameter. The c2c server 16 replies (step 320) to the client system 12 with an HTTP continue message that includes an updated menu. The updated menu appears on the display of the client system 12.

The user reviews (step 324) the updated menu and selects another menu item (now, e.g., the "Printers Department"). Another HTTP post command, which includes the presently selected menu item, passes (step 328) from the client system 12 to the c2c server 16. The c2c server 16 again replies (step 332) with an HTTP continue message having an updated menu. At this point, the user of the client system 12 activates the call now button, which causes an HTTP post command to pass (step 336) to the c2c server 16. The HTTP post command includes the user's communication address (user phone number) and a call now request. The c2c server 16 replies (step 340) with an HTTP continue message.

Referring now to FIG. 8B, the c2c server 16 sends (step 344) a setup call request to the IVR system. The setup call request includes the telephone numbers of the user phone and of the selected communication destination (here, e.g., service printers department). The IVR system sends (step 348) a PRI setup request containing the user phone number to the PBX 22. The PBX 22 issues (step 352) a PRI setup request to the PSTN 26 (with the user's phone number). The PSTN 26 rings (step 356) the user phone. When the user answers (step 360), the PSTN then sends (step 364) a PRI connect request to the PBX 22. The PBX 22 then issues (step 368) a PRI connect request to the IVR system.

In response to this PRI connect request, the IVR system issues (step 327) a PRI setup request to the PBX 22. The setup request includes the telephone numbers of the parties: the user phone and the phone of the service printers department. The PBX 22 rings (step 376) the phone of the communication destination (i.e., service_printers_DN). When the service printers department answers (step 380), the PBX 22 issues (step 384) a PRI connect request to the IVR system, thus establishing (step 388) a voice call between the user phone and the communication destination within the enterprise.

Aspects of the present invention may be embodied in hardware (digital or analog), firmware, software (i.e., program code), or a combination thereof. Program code may be embodied as computer-executable instructions on or in one or more articles of manufacture, or in or on computer-readable medium. Examples of articles of manufacture and computer-readable medium in which the computer-executable instructions may be embodied include, but are not limited to, a floppy disk, a hard-disk drive, a CD-ROM, a DVD-ROM, a flash memory card, a USB flash drive, an non-volatile RAM (NVRAM or NOVRAM), a FLASH PROM, an EEPROM, an EPROM, a PROM, a RAM, a ROM, a magnetic tape, or any combination thereof. The computer-executable instructions may be stored as, e.g., source code, object code, interpretive code, executable code, or combinations thereof. Generally, any standard or proprietary, programming or interpretive language can be used to produce the computer-executable instructions. Examples of such languages include C, C++, Pascal, JAVA, BASIC, Visual Basic, and C#. A computer, computing system, or computer system, as used herein, is any programmable machine or device that inputs, processes, and outputs instructions, commands, or data.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for establishing a communication session between an end user and a communication destination of an interactive voice response (IVR) system, the method comprising:

transmitting over a network for display in a browser window at a client system a web page presenting a web menu corresponding to an IVR audio menu of the IVR system, the web page having a link by which the end user of the client system can submit a click-to-call request;

receiving the click-to-call request from the client system over the network in response to activation of the link in the web page;

setting up a communication session between a communication device of the end user and a communication destination of the IVR system in response to receiving the click-to-call request; and wherein the web page displayed at the client system provides a searchable directory service corresponding to a directory service of the IVR system, the directory service of the IVR system including a directory of individuals who are reachable through the IVR system;

receiving a selection of a menu item; and transmitting a second web page in response to the item, the second web page presenting a current virtual location of the user with the IVR audio menu.

2. The method of claim 1, further comprising the step of receiving, concurrently with the click-to-call request, an identity of the communication destination selected by the end user.

3. The method of claim 2, wherein the step of setting up the communication session includes calling a telephone number associated with the communication destination.

4. The method of claim 1, wherein the step of setting up the communication session includes automatically sending to the IVR system dual-tone multi-frequency (DTMF) signals corresponding to phone digits associated with selecting the communication destination.

5. The method of claim 1, wherein the web menu includes a list of menu items, each menu item corresponding to a menu item of the IVR audio menu.

6. The method of claim 5, wherein each menu item of the web menu has a digit displayed adjacent thereto corresponding to a phone digit used to access the corresponding menu item of the IVR audio menu.

7. The method of claim 5, further comprising the steps of:
receiving a selection of a menu item; and
transmitting a second web page to the client system, the second web page presenting an updated list of menu items representing a current virtual location of the user within the IVR audio menu based on the selected menu item.

8. The method of claim 1, further comprising receiving, with the click-to-call request, supplemental information used by the IVR system to process the communication session with the end user.

9. A communications system comprising:
an interactive voice response (IVR) server for audibly presenting to an end user one or more menus that guide the end user to a communication destination; and
a click-to-call server transmitting over a network for display in a browser window at a client system a web page presenting a web menu corresponding to an IVR audio menu of the IVR system, the web page having a link by which an end user of the client system can submit a click-to-call request to the click-to-call server, the click-to-call server setting up a communication session between a communication device of the end user and a communication destination of the IVR server upon receiving the click-to-call request, wherein the web page displayed at the client system provides a searchable directory service corresponding to a directory service of the IVR system, the directory service of the IVR system including a directory of individuals who are reachable through the IVR system;
receiving a selection of a menu item; and
transmitting a second web page in response to the item, the second web page presenting a current virtual location of the user with the IVR audio menu.

10. The system of claim 9, wherein the click-to-call server receives concurrently with the click-to-call request an identity of the communication destination selected by the end user.

11. The system of claim 10, wherein the click-to-call server sets up the communication session by calling a telephone number associated with the communication destination.

12. The system of claim 9, wherein click-to-call server sets up the communication session by automatically sending to the IVR server dual-tone multi-frequency (DTMF) signals corresponding to phone digits associated with selecting the communication destination.

13. The system of claim 9, wherein the web menu includes a list of menu items, each menu item corresponding to a menu item of the IVR audio menu.

14. The system of claim 13, wherein each menu item of the web menu has a digit displayed adjacent thereto corresponding to a phone digit used to access the corresponding menu item of the IVR audio menu.

15. The system of claim 13, wherein the click-to-call server receives a selection of a menu item, and transmits a second web page to the client system, the second web page presenting an updated list of menu items representing a current virtual location of the user within the IVR audio menu based on the selected menu item.

16. The system of claim 9, wherein the click-to-call server forwards supplemental information received concurrently with the click-to-call request to the IVR server for use by the IVR server to process the communication session with the end user.

17. The method of claim 1 wherein, before said receiving the click-to-call request, receiving a dynamically update web page wherein a displayed web interface corresponds to a current virtual location of said end user in said IVR system.

18. The method of claim 17 wherein said location is considered virtual since said end user is not yet communicating with said IVR system.

19. The system of claim 9 wherein, before said transmitting the click-to-call request, receiving a dynamically update web page wherein a displayed web interface corresponds to a current virtual location of said end user in said IVR system.

20. The system of claim 19 wherein said location is considered virtual since said end user is not yet communicating with said IVR system.

* * * * *